(12) United States Patent
Schunder et al.

(10) Patent No.: US 9,846,046 B2
(45) Date of Patent: Dec. 19, 2017

(54) VEHICLE NAVIGATION METHOD AND SYSTEM

(75) Inventors: Mark Schunder, Dearborn, MI (US); Joseph J. Berry, Northville, MI (US); Mark Scalf, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 1726 days.

(21) Appl. No.: 12/847,665

(22) Filed: Jul. 30, 2010

(65) Prior Publication Data

US 2012/0029807 A1 Feb. 2, 2012

(51) Int. Cl.
G01C 21/00 (2006.01)
G01C 21/36 (2006.01)
G01C 21/28 (2006.01)

(52) U.S. Cl.
CPC .................................. *G01C 21/28* (2013.01)

(58) Field of Classification Search
CPC ..... G01C 21/26; G01C 21/3415; G01C 21/34
USPC ................................................ 701/201, 420
See application file for complete search history.

(56) References Cited

U.S. PATENT DOCUMENTS

| | | | |
|---|---|---|---|
| 4,937,751 A | 6/1990 | Nimura et al. | |
| 5,177,685 A | 1/1993 | Davis et al. | |
| 5,220,507 A | 6/1993 | Kirson | |
| 5,275,474 A | 1/1994 | Chin et al. | |
| 5,291,412 A | 3/1994 | Tamai et al. | |
| 5,351,779 A | 10/1994 | Yamashita | |
| 5,394,332 A | 2/1995 | Kuwahara et al. | |
| 5,406,491 A | 4/1995 | Lima | |
| 5,406,492 A | 4/1995 | Suzuki | |
| 5,487,002 A | 1/1996 | Diller et al. | |
| 5,578,748 A | 11/1996 | Brehob et al. | |
| 5,742,922 A | 4/1998 | Kim | |
| 5,767,795 A | 6/1998 | Schaphorst | |
| 5,790,973 A | 8/1998 | Blaker et al. | |
| 5,802,492 A | 9/1998 | DeLorme et al. | |
| 5,848,364 A | 12/1998 | Ohashi | |
| 5,901,806 A | 5/1999 | Takahashi | |
| 6,005,494 A | 12/1999 | Schramm | |

(Continued)

FOREIGN PATENT DOCUMENTS

| | | |
|---|---|---|
| CN | 1573296 | 2/2005 |
| DE | 102005029744 | 12/2006 |

(Continued)

OTHER PUBLICATIONS

Ford Motor Company, "Navigation System: SYNC," Owner's Guide Supplement, SYNC Version 1 (Jul. 2007).

(Continued)

*Primary Examiner* — Hiep V Nguyen
(74) *Attorney, Agent, or Firm* — Jennifer Stec; Brooks Kushman P.C.

(57) ABSTRACT

A vehicle based computing system processor is operable to receive the coordinates from a GPS and transmit the coordinates to a remote network. The processor is operable to receive map data pertaining to a route to be traveled by the vehicle, including a recommended starting road. The processor is able to audibly announce the recommended starting road name on which the vehicle is not presently traveling and to determine if the vehicle has reached that road. The processor is operable to output at least initial instructions for the route to be traveled.

10 Claims, 5 Drawing Sheets

(56) References Cited

U.S. PATENT DOCUMENTS

| | | | |
|---|---|---|---|
| 6,028,537 A | 2/2000 | Suman et al. | |
| 6,101,443 A | 8/2000 | Kato et al. | |
| 6,314,369 B1 | 11/2001 | Ito et al. | |
| 6,374,177 B1 | 4/2002 | Lee et al. | |
| 6,401,034 B1 | 6/2002 | Kaplan et al. | |
| 6,424,363 B1 | 7/2002 | Matsuba et al. | |
| 6,424,888 B1 | 7/2002 | Sone et al. | |
| 6,427,115 B1 | 7/2002 | Sekiyama | |
| 6,427,117 B1 | 7/2002 | Ito et al. | |
| 6,462,676 B1 | 10/2002 | Koizumi | |
| 6,484,092 B2 | 11/2002 | Seibel | |
| 6,484,093 B1 | 11/2002 | Ito et al. | |
| 6,487,477 B1 | 11/2002 | Woestman et al. | |
| 6,532,372 B1 | 3/2003 | Hwang | |
| 6,533,367 B1 | 3/2003 | Latarnik et al. | |
| 6,574,538 B2 | 6/2003 | Sasaki | |
| 6,574,551 B1* | 6/2003 | Maxwell et al. | 701/410 |
| 6,608,887 B1 | 8/2003 | Reksten et al. | |
| 6,691,025 B2 | 2/2004 | Reimer | |
| 6,791,471 B2 | 9/2004 | Wehner et al. | |
| 6,829,529 B2 | 12/2004 | Trefzer et al. | |
| 6,834,229 B2 | 12/2004 | Rafiah et al. | |
| 6,866,349 B2 | 3/2005 | Sauter et al. | |
| 6,904,362 B2 | 6/2005 | Nakashima et al. | |
| 6,999,779 B1 | 2/2006 | Hashimoto | |
| 7,053,866 B1 | 5/2006 | Mimran | |
| 7,082,443 B1 | 7/2006 | Ashby | |
| 7,089,110 B2 | 8/2006 | Pechatnikov et al. | |
| 7,113,107 B2 | 9/2006 | Taylor | |
| 7,167,799 B1 | 1/2007 | Dolgov et al. | |
| 7,243,134 B2 | 7/2007 | Bruner et al. | |
| 7,286,931 B2 | 10/2007 | Kawasaki | |
| 7,315,259 B2 | 1/2008 | Sacks | |
| 7,369,938 B2 | 5/2008 | Scholl | |
| 7,421,334 B2 | 9/2008 | Dahlgren et al. | |
| 7,486,199 B2 | 2/2009 | Tengler et al. | |
| 7,571,042 B2 | 8/2009 | Taylor et al. | |
| 7,626,490 B2 | 12/2009 | Kashima | |
| 7,642,901 B2 | 1/2010 | Kato et al. | |
| 7,653,481 B2 | 1/2010 | Tramel | |
| 7,706,796 B2 | 4/2010 | Rimoni et al. | |
| 7,726,360 B2 | 6/2010 | Sato et al. | |
| 7,804,423 B2 | 9/2010 | Mudalige et al. | |
| 7,818,380 B2 | 10/2010 | Tamura et al. | |
| 7,822,380 B2 | 10/2010 | Wu | |
| 7,822,546 B2 | 10/2010 | Lee | |
| 7,826,945 B2 | 11/2010 | Zhang et al. | |
| 7,894,592 B2 | 2/2011 | Book et al. | |
| 7,920,969 B2 | 4/2011 | Mudalige et al. | |
| 8,121,802 B2 | 2/2012 | Grider et al. | |
| 8,145,376 B2 | 3/2012 | Sherony | |
| 8,290,704 B2 | 10/2012 | Bai | |
| 2001/0001847 A1 | 5/2001 | Hessing | |
| 2002/0087262 A1 | 7/2002 | Bullock et al. | |
| 2002/0152018 A1 | 10/2002 | Duckeck | |
| 2003/0028320 A1 | 2/2003 | Niitsuma | |
| 2003/0036848 A1 | 2/2003 | Sheha et al. | |
| 2003/0040866 A1 | 2/2003 | Kawakami | |
| 2003/0040868 A1 | 2/2003 | Fish et al. | |
| 2003/0158652 A1 | 8/2003 | Friedrichs et al. | |
| 2004/0021583 A1 | 2/2004 | Lau et al. | |
| 2004/0117108 A1 | 6/2004 | Nemeth | |
| 2004/0117113 A1 | 6/2004 | Friedrichs et al. | |
| 2005/0085956 A1 | 4/2005 | Losey | |
| 2005/0144573 A1 | 6/2005 | Moody et al. | |
| 2005/0159881 A1 | 7/2005 | Furukawa | |
| 2006/0025923 A1* | 2/2006 | Dotan et al. | 701/207 |
| 2006/0026335 A1 | 2/2006 | Hodgson et al. | |
| 2006/0069504 A1 | 3/2006 | Bradley et al. | |
| 2006/0089788 A1 | 4/2006 | Laverty | |
| 2006/0145837 A1 | 7/2006 | Horton et al. | |
| 2006/0168627 A1 | 7/2006 | Zeinstra et al. | |
| 2006/0172745 A1 | 8/2006 | Knowles | |
| 2006/0184314 A1 | 8/2006 | Couckuyt et al. | |
| 2006/0190164 A1 | 8/2006 | Glaza | |
| 2006/0241857 A1 | 10/2006 | Onishi et al. | |
| 2006/0282214 A1 | 12/2006 | Wolterman | |
| 2007/0005241 A1 | 1/2007 | Sumizawa et al. | |
| 2007/0038362 A1 | 2/2007 | Gueziec | |
| 2007/0050248 A1 | 3/2007 | Huang et al. | |
| 2007/0093955 A1 | 4/2007 | Hughes | |
| 2007/0104224 A1 | 5/2007 | Conner et al. | |
| 2007/0143013 A1 | 6/2007 | Breen | |
| 2007/0143482 A1 | 6/2007 | Zancho | |
| 2007/0143798 A1 | 6/2007 | Jira et al. | |
| 2007/0198172 A1 | 8/2007 | Sumizawa et al. | |
| 2007/0203643 A1 | 8/2007 | Ramaswamy et al. | |
| 2007/0203646 A1 | 8/2007 | Diaz et al. | |
| 2007/0213092 A1 | 9/2007 | Geelen | |
| 2007/0219706 A1 | 9/2007 | Sheynblat | |
| 2007/0273624 A1 | 11/2007 | Geelen | |
| 2007/0290839 A1 | 12/2007 | Uyeki et al. | |
| 2008/0005734 A1 | 1/2008 | Poristoin et al. | |
| 2008/0065318 A1 | 3/2008 | Ho | |
| 2008/0082260 A1 | 4/2008 | Kimura | |
| 2008/0114534 A1 | 5/2008 | Yamazaki et al. | |
| 2008/0147305 A1 | 6/2008 | Kawamata et al. | |
| 2008/0147308 A1 | 6/2008 | Howard et al. | |
| 2008/0162034 A1 | 7/2008 | Breen | |
| 2008/0195305 A1 | 8/2008 | Jendbro et al. | |
| 2008/0228346 A1 | 9/2008 | Lucas et al. | |
| 2008/0303693 A1 | 12/2008 | Link, II | |
| 2009/0055091 A1 | 2/2009 | Hines et al. | |
| 2009/0063042 A1 | 3/2009 | Santesson et al. | |
| 2009/0083627 A1 | 3/2009 | Onda et al. | |
| 2009/0143934 A1 | 6/2009 | Motonaga et al. | |
| 2009/0177384 A1 | 7/2009 | Walder | |
| 2009/0186596 A1 | 7/2009 | Kaltsukis | |
| 2009/0192688 A1 | 7/2009 | Padmanabhan et al. | |
| 2009/0196294 A1 | 8/2009 | Black et al. | |
| 2009/0216434 A1 | 8/2009 | Panganiban et al. | |
| 2009/0228172 A1 | 9/2009 | Markyvech et al. | |
| 2009/0254266 A1 | 10/2009 | Altrichter et al. | |
| 2009/0259354 A1 | 10/2009 | Krupadanam et al. | |
| 2009/0326797 A1 | 12/2009 | Tengler et al. | |
| 2009/0326801 A1 | 12/2009 | Johnson et al. | |
| 2010/0010732 A1 | 1/2010 | Hartman | |
| 2010/0048184 A1 | 2/2010 | Kim | |
| 2010/0088018 A1 | 4/2010 | Tsurutome et al. | |
| 2010/0088029 A1 | 4/2010 | Hu et al. | |
| 2010/0094500 A1 | 4/2010 | Jin | |
| 2010/0094550 A1 | 4/2010 | Tsurutome et al. | |
| 2010/0138151 A1 | 6/2010 | Jang et al. | |
| 2010/0174485 A1 | 7/2010 | Taylor et al. | |
| 2010/0191463 A1 | 7/2010 | Berry et al. | |
| 2010/0198508 A1 | 8/2010 | Tang | |
| 2010/0217482 A1 | 8/2010 | Vogel et al. | |
| 2010/0241342 A1 | 9/2010 | Scalf et al. | |
| 2010/0245123 A1 | 9/2010 | Prasad et al. | |
| 2011/0003578 A1 | 1/2011 | Chen et al. | |
| 2011/0004523 A1 | 1/2011 | Giuli et al. | |
| 2011/0028118 A1 | 2/2011 | Thomas | |
| 2011/0046883 A1* | 2/2011 | Ross et al. | 701/209 |
| 2011/0178811 A1 | 7/2011 | Sheridan | |
| 2011/0238289 A1 | 9/2011 | Lehmann et al. | |
| 2011/0246016 A1 | 10/2011 | Vang et al. | |
| 2011/0255481 A1 | 10/2011 | Sumcad et al. | |
| 2012/0004841 A1 | 1/2012 | Schunder | |
| 2012/0173134 A1 | 7/2012 | Gutman | |
| 2013/0030630 A1 | 1/2013 | Luke et al. | |

FOREIGN PATENT DOCUMENTS

| | | |
|---|---|---|
| DE | 102010032229 | 1/2012 |
| EP | 1085299 | 3/2001 |
| JP | 2004021503 | 1/2004 |
| JP | 2005091193 | 4/2005 |
| JP | 20060337180 | 12/2006 |
| JP | 200964951 | 3/2007 |
| JP | 20080078696 | 4/2008 |
| JP | 20080162578 | 7/2008 |

(56) References Cited

FOREIGN PATENT DOCUMENTS

WO     WO2004076976     *     9/2004
WO     2008037471 A2     4/2008

OTHER PUBLICATIONS

Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).
Ford Motor Company, "Navigation System: SYNC," Owner's Guide Supplement, SYNC Version 3 (Jul. 2009).
Ford Motor Company, "SYNC," Owner's Guide Supplement, SYNC Version 3 (Aug. 2009).
Kermit Whitfield, "A hitchhiker's guide to the telematics ecosystem", Automotive Design & Production, Oct. 2003, http://findarticles.com, pp. 1-3.
Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.
Garmin Garage, Follow the Leader, www.garmin.com/garmin/cms/site/us.
TomTom, portable car navigation systems, http://www.tomtom.com, Feb. 6, 2009.
MapQuest Maps—Driving Directions—Map, http://www.mapquest.com, Aug. 25, 2009.
Multi-Modal Navigation Tools, TDM Encyclopedia, Jan. 26, 2010.
Google Maps Finally Adds Bike Routes, Mary Catherine O'Connor, Mar. 10, 2010, printed from www.wired.com/autopia/2010/03/google-maps-for-bikes/.
POI Along Route Qs, Printed from http://www.tomtomforums.com, printed Jul. 30, 2010.
Difficult POI search in Streets & Trips, printed from http://www.laptopgpsworld.com/3520-difficult-poi-search-streets-tips, printed Jul. 30, 2010.
http://www.rated4stars.com/html/gps-saves-gas.html.
http://www.gps.cx/index.php?c=1&n=493964&i=B001LTHONU&x=GPS_Buddy_FE01US_Fuel_Economy_Software_Package.
http://www.gpsmagaziine.com/2009/02/hands-on_with_garmins_new_ecor.php (Feb. 2009).
http://www.nrel.gov/vehiclesandfuels/vsa/pdfs/42557.pdf (Apr. 2008).
http://green.autoblog.com/2009/03/05/sentience-research-vehicle-shows-how-tons-of-data-can-save-milli/ (Mar. 2009).
http://reviews.cnet.com/8301-13746_7-10189749-48.html.
Navigator—A Talking GPS Receiver for the Blind, Ryszard Kowalik and Stanislaw Kwasniewski, Gdansk University of Technology, 2004.
Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106.
International Searching Authority, International Search Report and the Written Opinion for the corresponding PCT Application No. PCT/US2009/69668 dated Mar. 4, 2010.
International Searching Authority, The International Search Report and the Written Opinion of the International Searching Authority for the corresponding International Application No. PCT/US2010/23887 dated Apr. 12, 2010.
Patent Cooperation Treaty, International Preliminary Examining Authority, International Preliminary Report on Patentability for the corresponding PCT/US10/23887 dated Apr. 29, 2011.

* cited by examiner

VEHICLE NAVIGATION METHOD AND SYSTEM

BACKGROUND

GPS and other turn-by-turn navigation systems are becoming ever more prevalent as tools for determining a route to a particular destination. For example, a TOMTOM GPS is often a portable GPS that can be moved from vehicle to vehicle. Using satellite GPS signals, it determines where its present location on the globe is. This information is then combined with map and or heading information to determine a route to a selected destination.

Some vehicles also have built in GPS, and use, for example, an instrument display screen to display a route and/or directions. In other systems, directions can be spoken by a vehicle system to a driver, in lieu of or in addition to being displayed.

In general, GPS systems will determine a present location of a vehicle, determine a map location that corresponds to that present location, a provide directions from there. Of course, if the map data is incomplete or, for example, the vehicle is parked in the middle of a hay field, traditional "map directions" may not be available to the system on which directions to the driver can be based.

In addition to these situations, there are many "urban hayfields," in the form of parking lots, driveways, etc. whose location does not conform to any particular map location in GPS data. One solution would be to program all of these into a GPS map, but since they are prone to change and arise quite often, this may be a difficult task to undertake.

Accordingly, GPS systems need some method of "guessing" to determine how a vehicle is to get from a present "unknown" location to a location along a route to be traveled.

Additionally, some vehicle-based computing systems, such as the FORD SYNC system, may not store all of the map data in the vehicle, since storage space may be limited and needed for a variety of applications. As a result, relevant data about a certain area to be traveled may be dynamically transmitted in small packets. Since the vehicle may not be holding the entire map of an area, it is also useful to have a method for determining and/or providing directions to a route to be traveled from an unknown location.

As one example, if a vehicle is in parking lot 201 shown in FIG. 2, there could be a myriad of possibilities for getting to Main St. 209 (from which directions are provided). The system has no way of knowing that the user will take route 219, and, similarly, the system (using limited bandwidth), may not want to send enough information to cover all possible routes from the parking lot 201 to Main St. 209. Accordingly, it may be desired to have a method for providing a user with simple directions that do not require total knowledge of all possible routes.

SUMMARY

In one illustrative embodiment, a vehicle based computing system includes a communication link providing communication between a processor at the vehicle and a nomadic wireless communication device, an audio output controllable by the processor for outputting directions for traveling, and a GPS device capable of determining coordinates of the vehicle and relaying to coordinates to the processor.

In this illustrative embodiment, the processor is operable to receive the coordinates from the GPS receiver and transmit the coordinates through the communication link to the nomadic device. The nomadic wireless communication device then transmits these coordinates to a remote network.

Also in this embodiment, the processor is operable to receive, through the communication link, map data pertaining to a route to be traveled by the vehicle. The map data includes a recommended starting road. The starting road may be based at least in part on present coordinates of the vehicle as determined by the GPS device.

The processor is further operable to provide, through the audio or other output, instructions to travel to a recommended starting road name on which the vehicle is not presently traveling. In other words, if the recommended starting road was "Ford Road," the vehicle audio system would issue a command such as "proceed to Ford Road."

The processor is further operable to determine if a vehicle whose initial coordinates did not correspond to the recommended starting road is presently located at coordinates corresponding to the recommended starting road. In this instance, the vehicle was in a location for which map data was not available. The system can then determine that the vehicle is, at a given moment, now on the recommended starting road.

Next, based at least in part on the correspondence between the present location of the vehicle and recommended starting road coordinates (e.g., without limitation, the vehicle is on the starting road) the processor is operable to output at least initial instructions for the route to be traveled starting from the recommended starting road.

In another illustrative embodiment, a vehicle based computing system includes a communication link providing communication between a processor at the vehicle and a nomadic wireless communication device, an audio output controllable by the processor for outputting directions for traveling, and a GPS capable of determining coordinates of the vehicle and relaying to coordinates to the processor through a GPS receiver.

In this illustrative embodiment, the processor receives the coordinates from the GPS receiver and transmits the coordinates through the communication link to the nomadic wireless communication device, as in the previous embodiment.

The processor may also receive, through the communication link, map data pertaining to a route to be traveled by the vehicle.

The map data further includes a plurality of potential locations. The vehicle is likely (based on a calculation made, for example, by the remote network) to be located proximate to one of these potential locations, when the map data is received by the processor.

The processor is able to determine, based on GPS coordinates of the vehicle when the map data is received, which potential location most closely corresponds to the vehicle's location. The processor may also output one or more travel instructions, based at least in part on which potential location the vehicle is located proximate to.

In a third illustrative embodiment, a method of determining travel directions for a vehicle includes receiving input corresponding to coordinates and speed of a vehicle. The method also includes calculating how far the vehicle is likely to travel within a predetermined time span, based on at least the received speed input.

The method further includes approximating where the vehicle is located on a map based on the coordinates, and determining possible location points to which vehicle can travel on the map within the predetermined time span. This determination is based at least in part on the calculated possible distance of travel.

The method includes determining a preferred route of travel to a preselected destination, based at least in part on the coordinates of the vehicle. Also included in the method is determining one or more alternate routes of travel to the preselected destination from at least one of the possible location points.

Finally, the method includes transmitting a plurality of travel routes including a preferred route of travel and one alternate route of travel.

These figures are not exclusive representations of the systems and processes that may be implemented to carry out the inventions recited in the appended claims. Those of skill in the art will recognize that the illustrated system and process embodiments may be modified or otherwise adapted to meet a claimed implementation of the present invention, or equivalents thereof.

DETAILED DESCRIPTION

Figure 1:
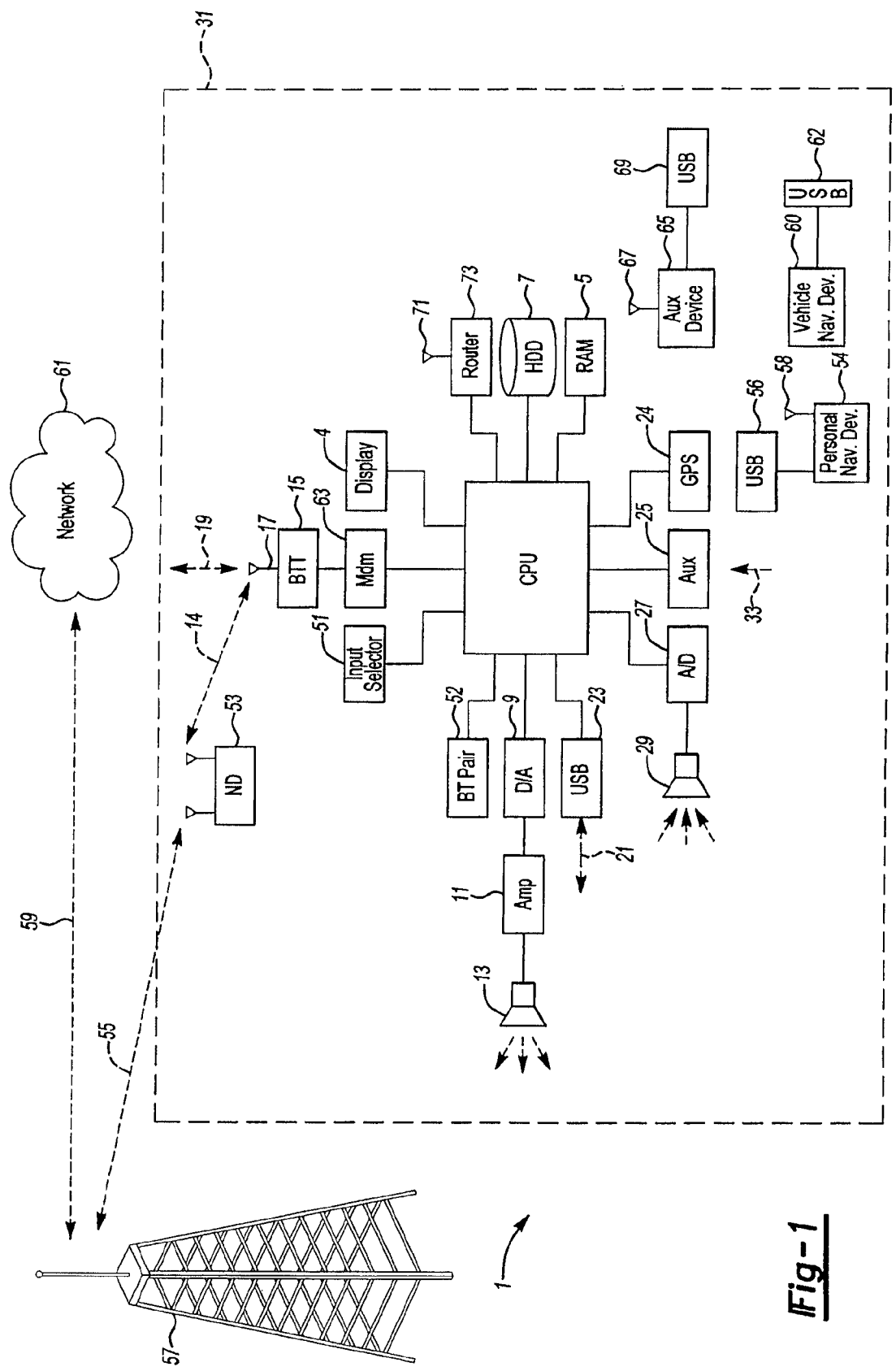
FIG. 1 shows an illustrative vehicle based computer system that may be used to implement the methods described herein and/or may in part contain or interface with the apparatuses described herein.

FIG. 1 illustrates an example block topology for a vehicle based computing system 1 for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, one or more processors (e.g. CPU) control at least some portion of the operation of the vehicle-based computing system. Provided within the vehicle, the processor allows onboard processing of commands and routines. Further, the processor may be connected to both non-persistent 5 and persistent storage 7. In this illustrative embodiment, the non-persistent storage is random access memory (RAM) and the persistent storage is a hard disk drive (HDD) or flash memory.

The processor may be provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 may be provided, to allow a user to swap between various inputs. Alternatively, inputs may be automatically selected and/or prioritized. Input to both the microphone and the auxiliary connector is converted from analog to digital by a converter 27 before being passed to the processor for processing.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as a personal navigation device (PND) 54 or a USB device such as vehicle navigation device 60 along bi-directional data streams shown at 19 and 21 respectively.

In one illustrative embodiment, the system 1 uses the BLUETOOTH transceiver 15 to communicate 17 with a user's nomadic device (ND) 53 (e.g., cell phone, smart phone, PDA, etc.). The nomadic device can then be used to communicate 59 with a network 61 outside the vehicle 31 through, for example, communication 55 with a cellular tower 57.

Exemplary communication between the nomadic device and the BLUETOOTH transceiver is represented by signal 14.

Pairing a nomadic device 53 and the BLUETOOTH transceiver 15 can be instructed through a button 52 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and to the vehicle's internal processor 3. In the case of certain temporary data, for example, the data can be stored in RAM 5 or on the HDD 7 or other storage media until such time as the data is no longer needed.

Additional sources that may interface with the vehicle include an onboard compass (not shown), a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection.

Also, or alternatively, the CPU could be connected to a vehicle based wireless router 73, using for example a WiFi 71 transceiver. This could allow the CPU to connect to remote networks in range of the local router 73.

Figure 2:
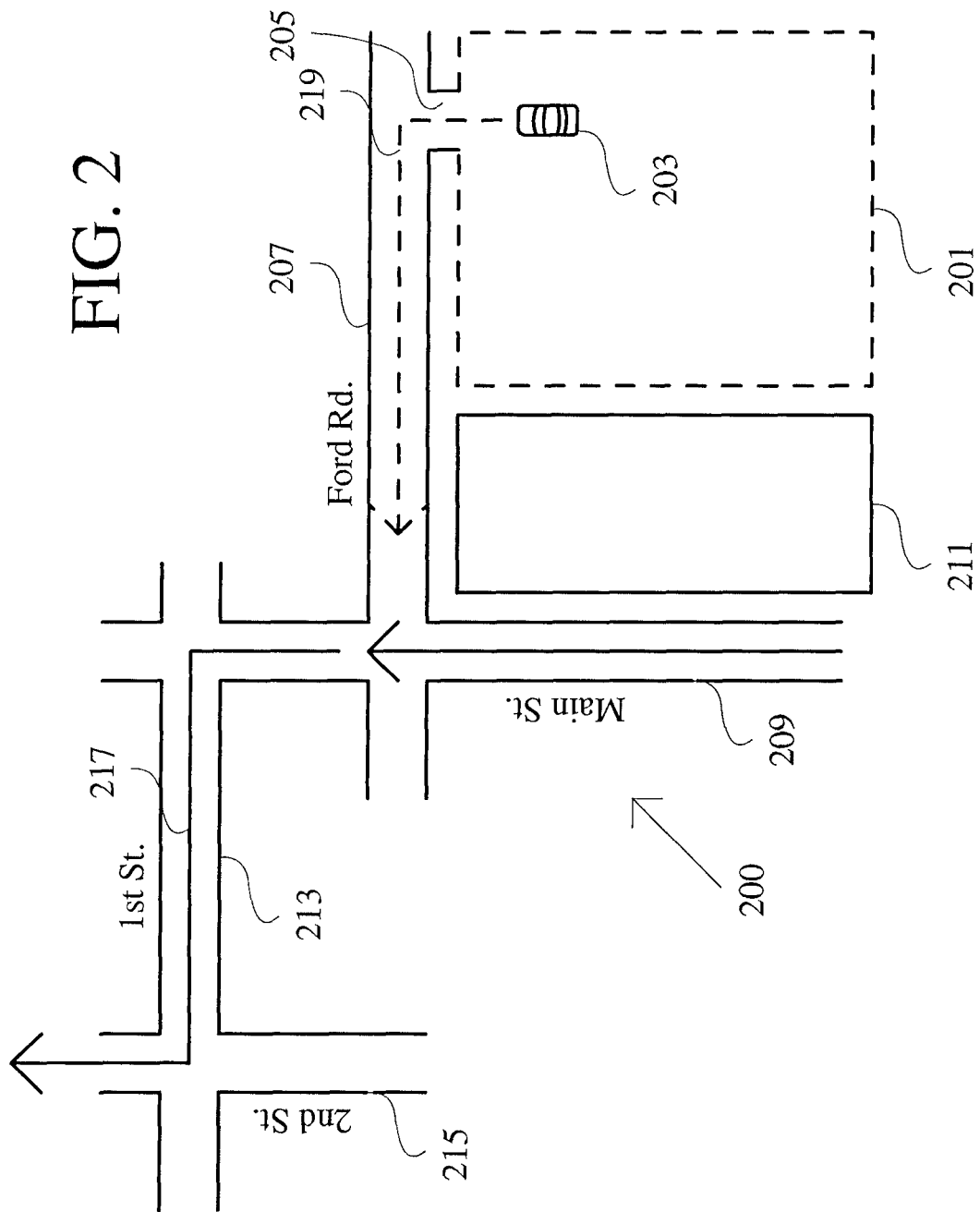
FIG. 2 shows an illustrative example of directing a vehicle from an "unknown" location to a desired route of travel.

FIG. 2 shows an illustrative example of directing a vehicle from an "unknown" location to a desired route of travel.

In this illustrative embodiment, a vehicle 203 is located in a parking lot 201 behind a building 211. The parking lot is not contained in the system map data of the vehicle based computing system (or personal/vehicle navigation devices 54 or 60), nor is the parking lot data available for download to the system.

The vehicle driver desires to travel the route marked 209, eventually turning right onto $2^{nd}$ St. 215. Obviously, it would be a problem for the system to "map" a straight line path to the route 209 from the vehicle 203, as in this case it would likely run into any number of buildings, curbs, medians, etc.

Instead, the system will provide a simple verbal (for example) instruction such as "proceed to Ford Rd." This can be especially useful if the system does not have a navigation display and cannot visually show the user a representation of the desired road/route.

The system may also provide additional direction, such as "proceed North to Ford Rd." in order to more easily facilitate travel to the recommended starting road 207. Using these directions, and an onboard compass, a driver can direct the vehicle 203 to exit the parking lot through exit 205, even if the vehicle computing system and navigation components are unaware of the existence of the exit 205.

Once the vehicle has exited onto the recommended road, the system can then direct the vehicle along path 219 to Main St. 209, at which point the route 217 can be presented, traveling to $1^{st}$ St. 213 and eventually to $2^{nd}$ St. 215.

Figure 2A:
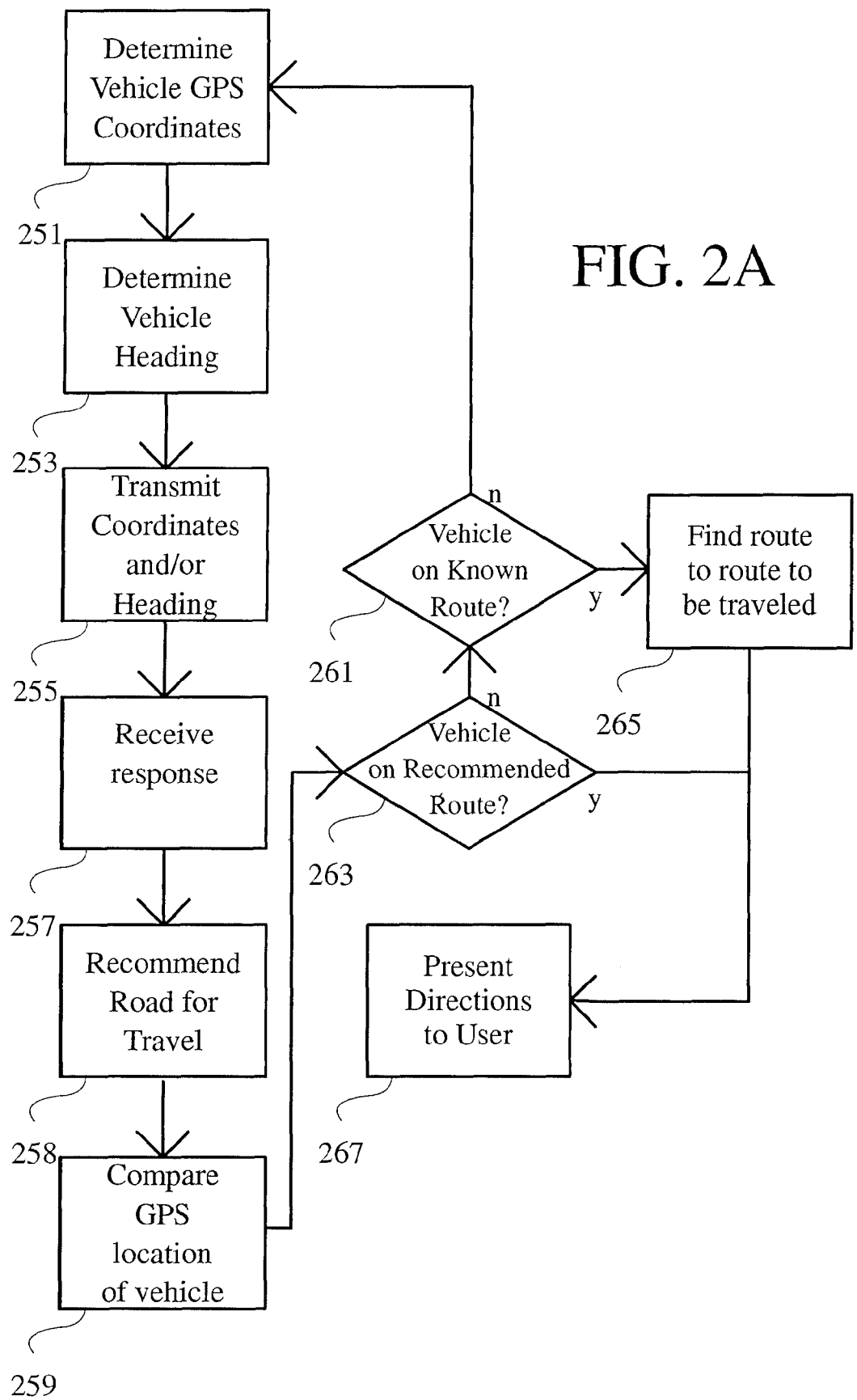
FIG. 2a shows an exemplary process for providing directions from a "non-mapped" location to a desired route of travel.

FIG. 2a shows an exemplary process for providing directions from a "non-mapped" location to a desired route of travel.

In this illustrative embodiment, the vehicle based computing system first determines the GPS coordinates of the vehicle 251. This can be done, for example, by a call from a processor included with the vehicle based computing system to a GPS included in the vehicle (or connected to the processor through a wired or wireless connection).

Once the processor has obtained the GPS coordinates, it may also, at least in this embodiment, determine the vehicle heading 253, using, for example, an onboard compass. The GPS coordinates and the heading (if determined) may be transmitted to a remote network 255. In this illustrative embodiment, the processor is connected to a nomadic device, such as, but not limited to, a cellular phone. The processor transmits the data to the cellular phone or other nomadic device, and the nomadic device connects to the remote network to complete transmission.

The processor then receives a response from the remote network 257. Again, in this illustrative implementation, the response is transmitted from the network, to the nomadic device, to the processor.

According to this illustrative embodiment, the response will contain at least one recommended road to which the vehicle should travel, if the vehicle is not presently on a known road (e.g., without limitation, in a parking lot).

There may be a variety of roads to which the vehicle could travel from the parking lot. The remote network (or the processor) may select one based at least in part on the vehicle's GPS coordinates (those at the time of transmission or the present coordinates) and/or the vehicle's heading (again, the heading at the time of transmission or the present heading).

Since there is a degree of "lag" between the transmission of the coordinates and/or heading and the receipt of a response, a developer may elect to have the network perform the calculation as to which nearby road is desired, or, to better avoid this lag, the developer may elect to have the processor receive several options for roads and then perform the calculation based on real time positioning and heading data.

Once a response has been received and a recommended road has been selected, the processor may then instruct the driver of the vehicle as to which road should be accessed to reach the desired route of travel 258. This instruction can be done, for example, over the vehicle audio system or on a navigational display.

The vehicle computing system can then, either once or periodically for some predetermined period of time, compare the GPS location of the vehicle to coordinates corresponding to the recommended road and any other possible known roads 259.

This process can be done in a variety of ways, and the example shown here is meant for illustrative purposes only. The system will also check if the present coordinates correspond to the recommended route 263, and, if not, then if they correspond to a "known" route (e.g., without limitation, an alternative road). If the coordinates are on neither a recommended or known route, the system may proceed back to step 251, or, alternatively, for example, continue back to step 259 (not shown) to continue checking coordinates, for a fixed period of time, until a known route is reached, etc.

If the vehicle's present coordinates correspond to a known route that is not the recommended route, the system will find a route to be traveled based on the vehicle's present location 265. This determination can be made, for example, by using locally stored map data or by communication with the remote network (if, for example, the local map data is insufficient).

Once a route is known, the vehicle will present the next set of directions to the user 267.

Figure 3:
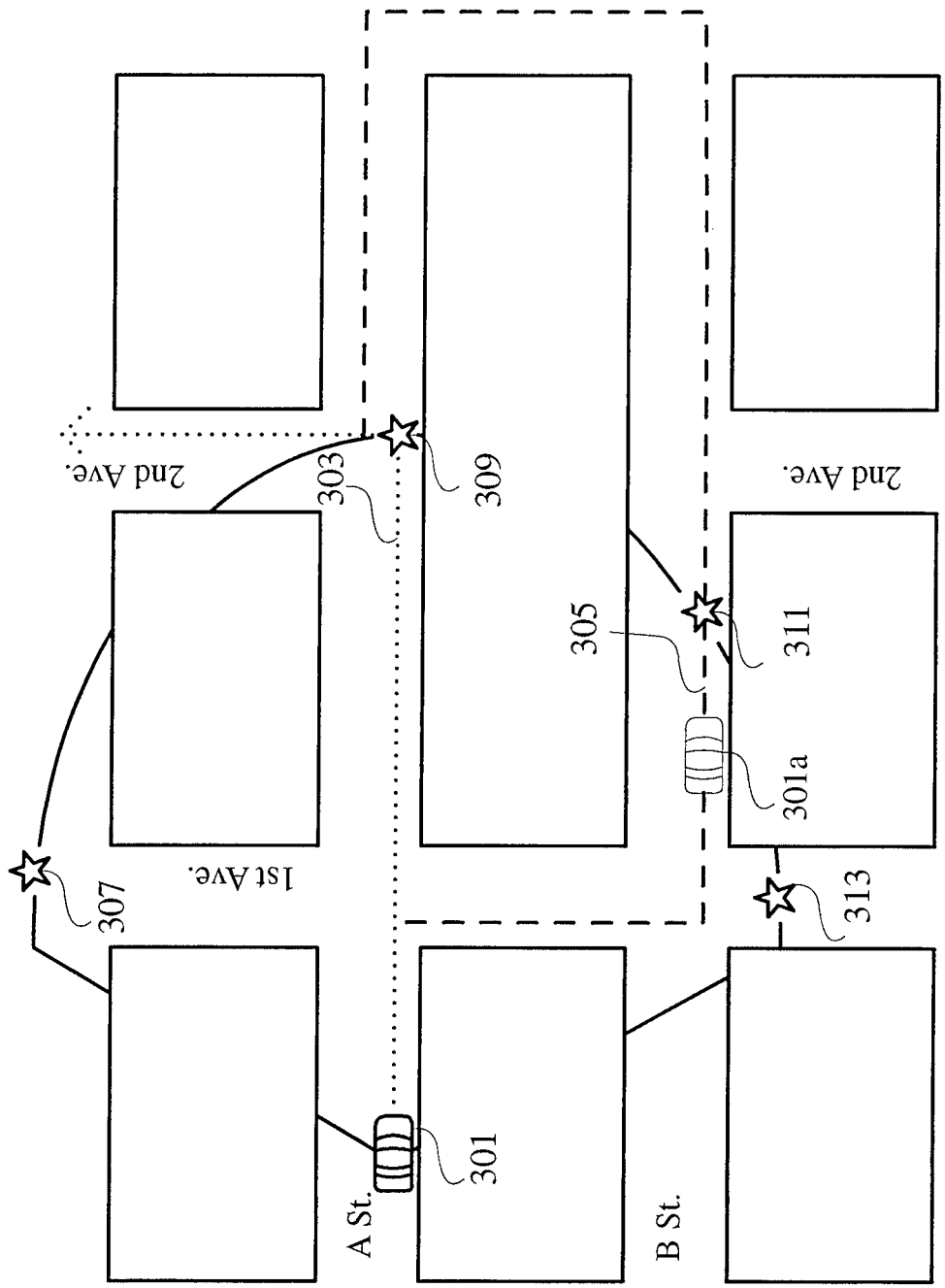
FIG. 3 shows an illustrative example of a micro-route system implementation.

FIG. 3 shows an illustrative example of a micro-route system implementation.

In at least one illustrative embodiment, data related to a vehicle's present location is transmitted from a vehicle based computing system to a remote network. However, in this embodiment, the vehicle based computing system doesn't have a direct connection with the network. Instead, the information is transmitted through a connection with a nomadic device, and the nomadic device provides the communication to the network. Further, this transmission may be done in a data-over-voice manner, such that the bandwidth may be limited.

While this method still provides fast communication, there may be a delay of several seconds before the needed information is relayed to the network and back to the vehicle. Since the vehicle may be moving at the time, information about the vehicle's location when the request was sent to the network may not correspond to the vehicle's location by the time the response is received.

For example, if a vehicle was traveling at 60 miles per hour down a road, and there was a four second delay, then the vehicle would be approximately 352 feet further down the road by the time the response was received. This could present a problem if the exit onto which the vehicle was to turn was only 250 feet down the road when the request was sent. The vehicle could also have turned onto a side road on which it was not previously traveling, etc.

In the example shown in FIG. 3, the vehicle 301 should travel route 303 to reach an intended destination. That is, under optimal conditions, the vehicle would proceed straight from its present location in the figure at position 301 and turn at location 309.

If, however, there is construction or if the vehicle just turns (because the driver made an unanticipated turn), the instructions for the vehicle now need to be changed.

In the example shown, the vehicle driver would initially receive instructions to proceed east on A St. and turn left on $2^{nd}$ Ave. These instructions are received at some point prior to the vehicle reaching the point 301.

At point 301, the vehicle asks for updated instructions (as part of a regular communication to ensure route integrity, for example). The vehicle is presently traveling at, for example, 30 miles an hour. By the time the instruction request has been sent to the network and a response has been received, the vehicle has deviated from the intended route and is now at position 301*a*.

If the remote system merely sent back data and instructions for the optimal route (i.e., take A St. to $2^{nd}$ Ave.), a further request would need to be sent to the system based on the new vehicle position. Of course, the vehicle could again change positions while the request was pending, resulting in a stream of directions that arrived possibly too late to be useful.

Instead, however, in this illustrative embodiment, the vehicle heading and speed are transmitted along with the GPS coordinates. Using this information, the network can estimate possible positions at which the vehicle could be located by the time the information returns to the vehicle based computing system.

In this illustrative example, the system estimates that the vehicle could, based on present speed and heading, be located at 313, 311, 309 or 307. Accordingly, directions (or at least map data) from those points to the preferred route of travel are provided to the vehicle based computing system.

In this manner, the system can accurately provide directions to the preferred route of travel, regardless of which of the four points the vehicle is closest to.

So, for the example shown, the vehicle has moved to position 301*a*. Since this location is closest to (and the vehicle is oriented towards) location 311, the vehicle based computing system will provide the driver with directions to travel along route 305 until it rejoins with the preferred route of travel 303. The system could also reroute to a destination based on different possible location points.

Further, in this illustrative embodiment, possible location points are located in roughly a 180 degree arc in front of the vehicle. This prevents data pertaining to all possible routes in every direction from having to be transmitted to the vehicle based computing system. This is effective if the developer wishes to assume that the vehicle will vary rarely make an unexpected turn of more than 180 degrees. It is, of course, also possible to transmit data pertaining to a wider or narrower possible spectrum of potential locations.

Figure 4:
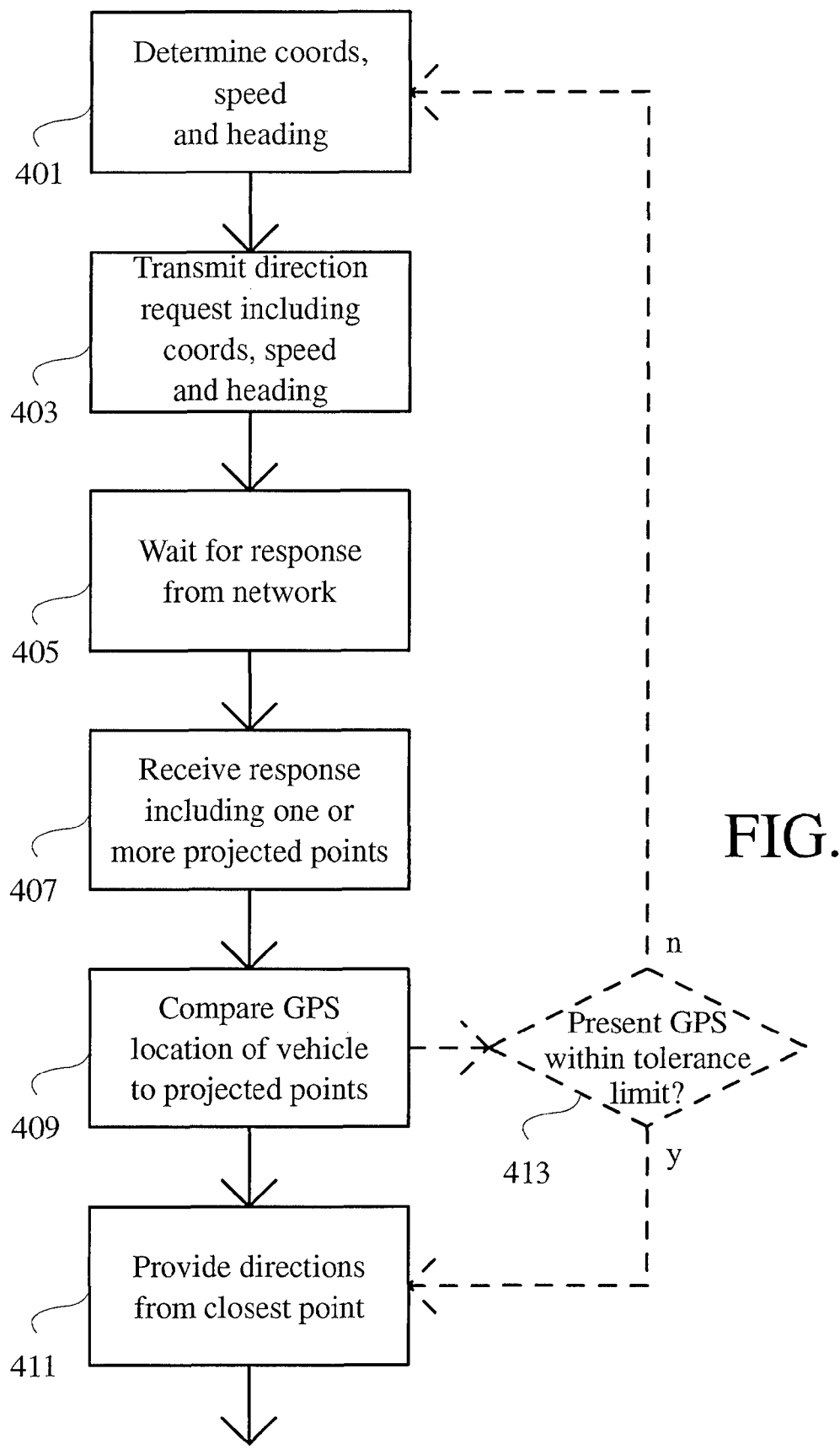
FIG. 4 shows an illustrative example of a process for providing a route using a micro-route system.

FIG. 4 shows an illustrative example of a process for providing a route using a micro-route system.

In this illustrative embodiment, the processor of the vehicle based computing system determines the coordinates, speed and heading of the vehicle 401. The speed and heading information can often be obtain from the vehicle's CAN bus and is often provided by existing vehicle systems.

The GPS coordinates can be obtained from, for example, a built in GPS. They could also be obtained from a GPS connected to the vehicle computing system through a wired or wireless connection. In another illustrative embodiment, a nomadic device such as a cellular phone may provide the GPS coordinates to the vehicle based computing system.

Once the coordinates, speed and/or heading are obtained by the processor, the system transmits some or all of this information to a remote network.

In this illustrative embodiment, the remote network transmission is done through a connection to a nomadic device. The vehicle based communication system transmits information to the nomadic device, and the nomadic device transmits the information to a remote network 403.

The system then waits for a response from the remote network 405.

Once the remote network is done processing the requested information, the vehicle based computing system receives a response 407. This response includes one or more projected vehicle location points. These are the points corresponding to the stars in FIG. 3.

The projected location points are then compared to the actual GPS location of the vehicle at the time the response is received (or at the time the comparison is done, etc.) 409. Unless the guess by the network was grossly inaccurate, or unless (in this example at least), the vehicle did not turn more than 180 degrees, the vehicle should be proximally located to at least one of the projected location points.

Once the system knows which point the vehicle is closest too, directions are then provided from that point. Presumably, local map data may be included with the information, so that, if the vehicle is not directly on the projected point, directions to the point can also be provided if needed.

If the vehicle is not in the proximity of one of the projected points, the system may call the network for another set of directions, using the same information. This embodiment is shown by the dashed option in FIG. 4. Instead of proceeding directly to providing directions from the closest projected point, the system first checks to see if the present GPS cords are within a tolerance distance of the closest projected point 413. If not, the system repeats the call to the server, otherwise directions are provided as in the first illustrative embodiment.

While various exemplary, illustrative, non-limiting embodiments have been described in detail, those familiar with the art to which this invention relates will recognize various alternative designs and embodiments for practicing the invention, which is only limited by the following claims.

What is claimed:

1. A computer-implemented method of determining travel directions for a vehicle comprising:
   receiving, at a navigation computer, input representing vehicle coordinates and speed of a vehicle;
   calculating, via the navigation computer, how far the vehicle is likely to travel within a predetermined time span, representing an estimated route calculation and transmission time, based on the vehicle speed;
   determining where the vehicle is located on a map based on the coordinates;
   determining possible location points to which the vehicle can travel on the map within the predetermined time span, based on the likely distance of travel;
   determining a route of travel to a destination based on the coordinates of the vehicle;
   determining one or more alternate routes of travel to the destination from at least one of the possible location points; and
   transmitting to the vehicle a preferred route of travel and at least one alternate route of travel.

2. The method of claim 1, additionally comprising calculating how far the vehicle is likely to travel or possible location points based on a heading of the vehicle.

3. The method of claim 2, wherein the determining possible location points determines possible location points within a 180 degree arc in front of the vehicle, based on a vehicle heading.

4. The method of claim 1, wherein the one or more alternate routes are routes back to a point on the preferred route.

5. The method of claim 1, additionally comprising outputting at an audio or display output at the vehicle the preferred route of travel or the alternative route of travel.

6. A non-transitory computer readable storage medium storing a plurality of computer instructions, that, when executed, cause a computing system to perform the steps: receive input corresponding to coordinates and speed of a vehicle; calculate how far the vehicle is likely to travel within a predetermined time span, representing an estimated route calculation and transmission time, based on at least the received speed input; determine where the vehicle is located on a map based on the coordinates; determine possible location points to which the vehicle can travel on the map within the predetermined time span, based on the possible distance of travel; determine a preferred route of travel to a destination based on the coordinates of the vehicle; determine one or more alternate routes of travel to the destination from at least one of the possible location points; and transmit travel routes to the vehicle including at least the preferred route of travel and one alternate route of travel.

7. The computer readable storage medium of claim 6, wherein the instructions further include instructions for receiving input corresponding to a vehicle heading, and calculating how far the vehicle is likely to travel based on the heading input.

8. The computer readable storage medium of claim 7, wherein the instructions further include instructions for determining possible location points within a 180 degree arc in front of the vehicle, based on the heading input.

9. The computer readable storage medium of claim 6, wherein the one or more alternate routes are routes back to a point on the preferred route.

10. The computer readable storage medium of claim 6, wherein the instructions further include instructions for outputting one or more of the routes at the graphical display or audio output at the vehicle.

* * * * *